I. Snider,
BEST AVAILABLE COPY
Plow.
A I No. 44. (A.I.) Patented May 11. 1841.
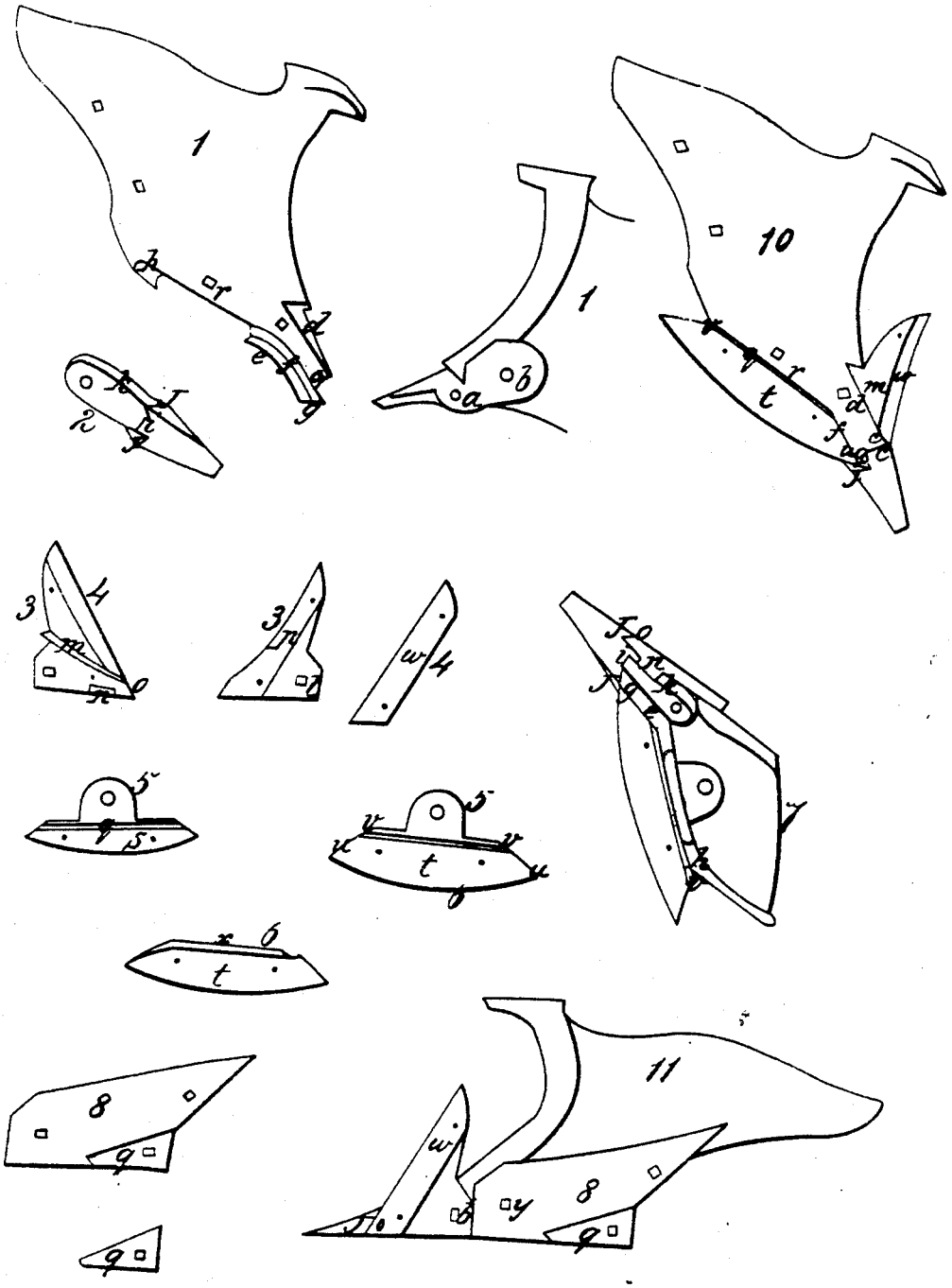
THE GRAPHIC CO. PHOTO-LITH. 39 & 41 PARK PLACE, N.Y.